Oct. 10, 1950 R. F. GRUNWALD 2,524,790
METHOD AND APPARATUS FOR MAKING COMPARATIVE
MEASUREMENTS ON OSCILLOSCOPES
Filed Aug. 23, 1944 2 Sheets-Sheet 1

Inventor
ROBERT F. GRUNWALD

Attorney

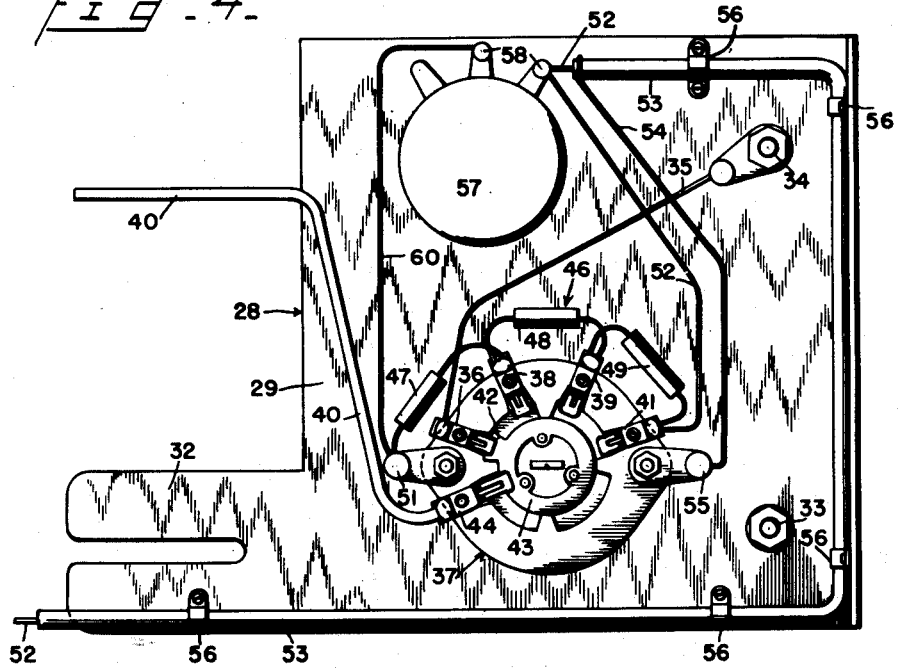
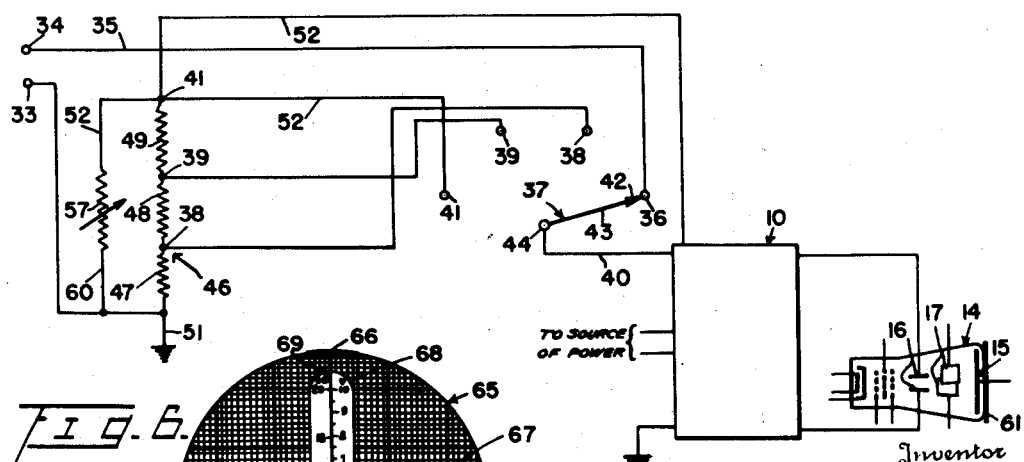

Patented Oct. 10, 1950

2,524,790

UNITED STATES PATENT OFFICE 2,524,790

METHOD AND APPARATUS FOR MAKING COMPARATIVE MEASUREMENTS ON OSCILLOSCOPES

Robert F. Grunwald, Washington, D. C.

Application August 23, 1944, Serial No. 550,818

7 Claims. (Cl. 171—95)

(Granted under the act of March 3, 1883, as amended April 30, 1928; 370 O. G. 757)

This invention relates to improvements in cathode-ray oscilloscopes of conventional design and methods of use thereof whereby use of the oscilloscopes in making comparative measurements of deflections of the electron beam thereof corresponding respectively to known and unknown signal components is facilitated. More specifically, the present invention contemplates improvements in an oscilloscope whereby use thereof as a voltmeter is facilitated by the provision of new and improved means for applying an unknown voltage and any one of a plurality of reference voltages selectively at will to the vertical axis amplifier of the oscilloscope any by the provision of methods for calibrating the beam deflections respectively corresponding to the aforesaid voltages against a scale mounted substantially in face adjacency with the screen of the oscilloscope whereby the amplitude of the unknown voltage may be measured as a fractional value of the reference voltage compared therewith.

According to the arrangement of the invention the unknown voltage and the voltages of a plurality of reference voltage sources comprising a voltage divider network selectively are adapted to be applied at will to the vertical axis amplifier of the oscilloscope by means of a multi-position switch whereby the amplifier may be transferred quickly between the aforesaid voltages thereby to facilitate calibration of beam deflections corresponding thereto, as will appear in greater detail hereinafter. The voltage divider network preferably is arranged to be energized by a source of power on the oscilloscope or selectively may be supplied by a suitable auxiliary source of power, if desired, in the event that a suitable source is not provided on the oscilloscope. In either case, additional means are provided for adjusting the value of the voltage across the divider network whereby the voltage values of the several reference voltage sources may be brought into conformance with indicia means corresponding thereto and associated respectively with the several positions of the multi-position switch.

The aforesaid multi-position switch and voltage divider network and voltage adjustment means therefor preferably are provided in the form of an attachment comprising a chassis or panel adapted readily to be mounted on the oscilloscope by means of the terminals thereon, for example, and requiring a minimum of circuit connections thereto, which connections may be made without interfering with the normal circuit connections or use of the oscilloscope.

In calibrating electron beam deflections corresponding respectively to an unknown voltage and to a reference voltage to be compared therewith against the aforesaid scale according to one of the methods disclosed herein, the multi-position switch is first moved into the test or signal position thereof in which the unknown voltage is adapted to be applied to the switch wiper, thereby to apply the unknown voltage to the vertical axis amplifier and to produce a deflection corresponding thereto, the deflection produced by an unknown signal component or voltage, as the case may be, being hereinafter referred to as an unknown deflection. The gain control of the amplifier thereafter is adjusted to spread the deflection over a substantial length of the scale, the gain control of the horizontal axis amplifier, for this purpose, being previously set in the zero position thereof. With the setting of the vertical axis gain control unchanged, the multi-position switch is then set in a position thereof corresponding to a reference voltage providing a deflection which falls within the limits of the scale and preferably is slightly greater than the deflection corresponding to the unknown voltage, the deflection produced by a known or reference signal component or voltage, as the case may be, hereinafter being referred to as a known or reference deflection. The vertical axis gain control is then adjusted to spread the known deflection to full scale, and the multi-position switch thereafter is restored to the test or signal position thereof, thereby to apply the unknown deflection to the scale, and finally, the value of the unknown voltage corresponding thereto is read directly on the scale as a fractional value of the reference voltage, the value of the reference voltage being as indicated by the indicia corresponding to the instant setting of the multi-position switch.

An object of the present invention is to provide new and improved means whereby an oscilloscope of conventional design may be used in making comparative measurements of electron beam deflections corresponding to known and unknown signal components applied to the amplifier of the oscilloscope.

Another object of the invention is the provision of new and improved means for an oscilloscope of conventional design whereby the oscilloscope may be used as a voltmeter.

Another object is the provision of means for applying an unknown voltage and a plurality of reference voltages selectively at will to the vertical axis amplifier of an oscilloscope and to provide a method for comparing electron beam deflections respectively corresponding to the voltages whereby the amplitude of the unknown voltage may be measured as a fractional value of the known voltage.

Another object is the provision of a scale adapted to be arranged substantially in face adjacency with the screen of an oscilloscope and a method of calibrating against the scale electron beam deflections corresponding respectively to known and unknown signal components applied to the amplifier of the oscilloscope whereby the amplitude of the unknown signal component may be measured as a fractional value of a known signal component compared therewith.

A further object is the provision of a method of calibrating deflections of the electron beam of an oscilloscope with respect to a scale mounted substantially in face adjacency with the fluorescent screen of the oscilloscope.

A further object is to provide an attachment for and oscilloscope of a conventional design which facilitates the use of the oscilloscope as a voltmeter.

A still further object is to provide an attachment for an oscilloscope whereby known and unknown signal components selectively may be applied at will to the amplifier of the oscilloscope and the amplitude of the unknown signal component may be measured by a comparison of the beam deflections of the oscilloscope corresponding to the known and unknown signal components respectively.

Still another object is to provide a calibrating attachment for an oscilloscope which readily may be adapted thereto and comprises circuit means which readily may be connected to the terminals thereof with a minimum of connections and without interfering with the normal circuit connections or use of the oscilloscope.

Still another object is the provision of a calibrating attachment for an oscilloscope in which a plurality of reference voltage sources comprising a voltage divider network adapted to be energized by a voltage source on the oscilloscope or selectively by any suitable auxiliary source of voltage is provided and additional means is employed for adjusting the value of the voltage across the divider network.

An additional object of the invention is to provide a calibrating attachment for an oscilloscope which includes a plurality of reference voltage sources comprising a voltage divider network and switch means for applying the voltages of said voltage sources and an unknown voltage selectively at will to the amplifier of the oscilloscope.

Still other objects and advantages of the invention not specifically set forth hereinbefore are those implied from or inherent in the novel construction, combination, and arrangement of parts, as will become more clearly apparent from the following description, taken in connection with the accompanying drawings, of which:

Fig. 4 is a rear view in elevation of the attachment;

Fig. 5 shows in diagrammatic form a circuit arrangement suitable for use with the present invention; and, Fig. 6 is an alternate form of a scale suitable for use with the invention.

Figure 1:
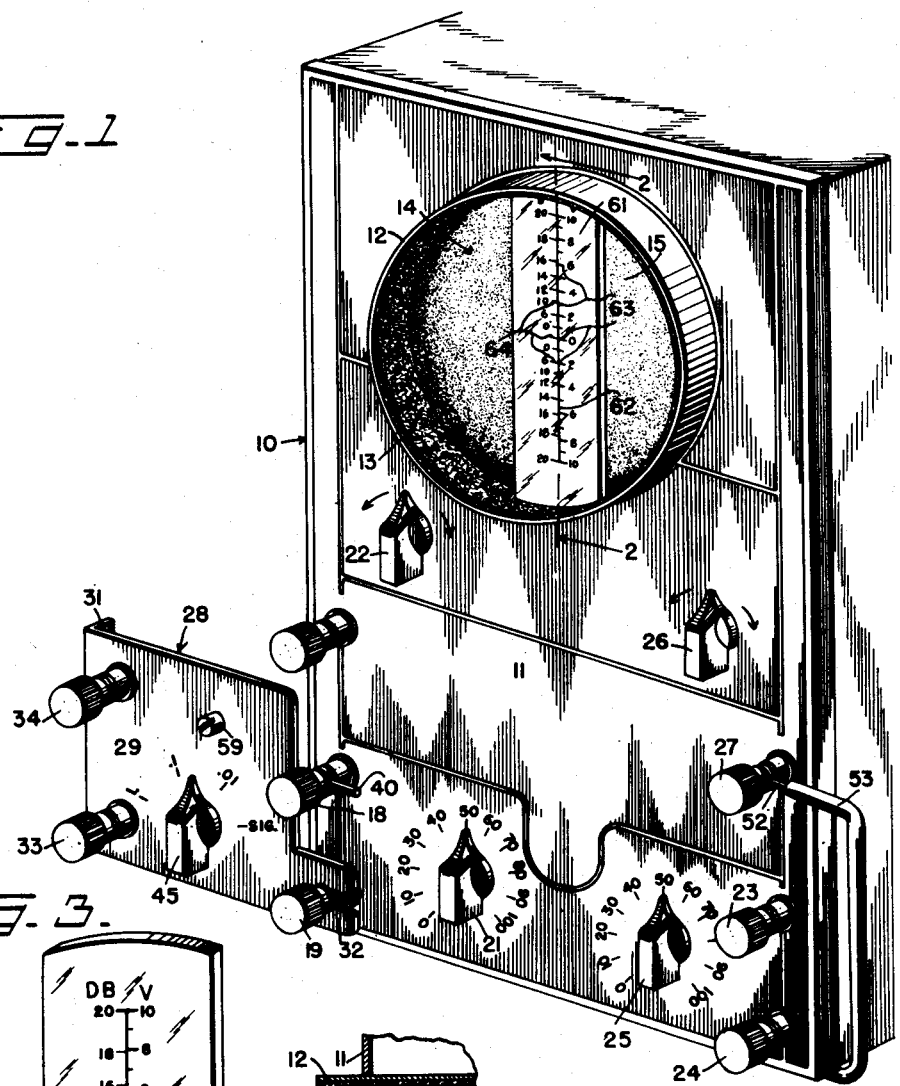
Fig. 1 is a perspective view of an oscilloscope of conventional design having a calibrating attachment according to a preferred embodiment of the invention mounted thereon.

Referring now to the drawings for a more complete understanding of the invention and more particularly to Fig. 1 thereof, the numeral 10 generally designates an oscilloscope of conventional design having a front panel 11 through which an enclosure ring 12 projects. The enclosure ring is lined internally with a suitable resilient material such, for example, as the strip of felt 13 which serves yieldably to support a cathode-ray tube 14 within the enclosure ring.

The cathode-ray tube may be of conventional design comprising, for example, an elongated, evacuated glass bulb having at one end thereof means for generating a beam of electrons and focusing the beam into a fine point on a fluorescent screen 15 arranged on the inside of the bulb at the opposite end thereof and having a first pair of plates 16 and a second pair of plates 17 arranged at right angles therewith through which the electron beam is directed whereby the electron beam in impinging on the screen causes a spot of light or trace to be emitted therefrom, which spot of light changes its position in accordance with the deflection of the electron beam caused by the resultant of electrostatic fields produced by the differences in the potential applied between said pairs of plates respectively.

The cathode-ray tube is arranged within the enclosure ring 12 such that the screen 15 of the tube is substantially flush with the panel 11, and the tube is oriented within the enclosure ring in such a manner that the pair of plates 16 are disposed such that a vertical trace is caused to appear on the screen 15 when a voltage is applied to plates 16 and, in like manner, a horizontal trace is caused to appear on the screen when a voltage is applied to plates 17.

It will be understood that the oscilloscope 10 comprises the usual gain-control amplifier (not shown) for controlling the amplitude of the beam deflections appearing along the vertical axis of the oscilloscope, which amplifier is connected at the output end thereof to the plates 16 and is connected at the input end thereof to the vertical axis terminal post 18 and the ground post 19 associated therewith. The gain of the vertical axis amplifier is controlled in the usual manner by means of a control button or knob 21 having the well known indicia associated therewith on the panel 11 for indicating a particular setting of the gain control. The vertical axis amplifier also includes means under control of a control button or knob 22 for adjusting the position of a deflection or trace along the vertical axis of the oscilloscope.

It further will be understood that the oscilloscope also comprises a second gain-control amplifier (not shown) for controlling the amplitude of beam deflections along the horizontal axis of the oscilloscope, which amplifier is connected at the output end thereof to plates 17 and is connected at the input end thereof to the horizontal axis terminal post 23 and the ground terminal post 24 associated therewith, the gain of the horizontal axis amplifier being adjusted by the settings of the control button or knob 25 with respect to the indicia associated therewith, the position of the deflection or trace along the horizontal axis being adjusted by means under control of the control button or knob 26.

The oscilloscope also comprises a test signal terminal post 27 which is connected, for example, to a secondary winding of the power transformer of the oscilloscope (not shown) whereby a suitable source of A. C. power is rendered available between the terminal post 27 and the ground potential at terminal posts 19 or 24.

The numeral 28 generally designates an attachment for the oscilloscope which comprises a metallic panel or chassis 29 having a bent back portion 31 providing a rigid structure and a bifurcated portion 32 by means of which the chassis readily may be secured to the ground terminal 19, for example, thereby to attach the chassis securely to the oscilloscope and additionally to ground the same thereto.

The chassis 29 preferably carries a terminal post 33 which is grounded thereto and a terminal post 34 which is insulated therefrom by any suitable means and which is electrically connected by means of a conductor 35, Fig. 4, to a contact terminal 36 comprising a multi-position switch generally designated by the numeral 37. Contact terminal 36 and like contact terminals 38, 39, and 41 of switch 37 are arranged to be engaged selectively by the switch wiper 42 of a movable contact ring 43 which is in continuous electrical contact with a contact terminal 44 adapted to be electrically connected to the vertical axis terminal post 18 by way of conductor 40. Movement of the contact ring 43 is accomplished under control of a manipulatable button or knob 45, Fig. 1, of which the pointer portion is adapted to be brought selectively into alinement with a plurality of indicia on the panel 29 and corresponding respectively to each of the settings of the contact ring in which the wiper portion 42 thereof selectively engages the aforesaid terminal contacts, the plurality of indicia comprising, for example, numerals 1., .1 and .01 and the letters SIG.

A voltage divider network generally designated 46 and comprising a plurality of series connected resistors 47, 48 and 49 is grounded at one end thereof to the chassis and switch at 51 and connected at the other end thereof to the terminal contact 41 with the junction of resistors 48, 49 being electrically connected to contact terminal 39 and the junction of the resistors 47, 48 being electrically connected to contact terminal 38. The divider network 46 is arranged to be energized by way of a shielded conductor or cable 52 from the A. C. source of power at terminal post 27 on the oscilloscope or selectively from an auxiliary source of power in the event that a suitable source of power is not available on the oscilloscope. Cable 52 is provided with a shielded covering 53 which is grounded to the chassis and switch 37 at 55 by way of a conductor 54, a plurality of clamps 56 preferably being employed to maintain the cable 52 in position on the chassis, substantially as shown.

The values of resistors 47, 48 and 49 are selected such that the values of the voltages between ground potential and the points 38, 39 and 41 in the voltage divider network 46 and the correspondingly numbered contact terminals of the switch 37 agree substantially with the aforesaid indicia .01, .1, and 1. associated with the multi-position switch 37 whereby the voltage divider network serves to provide a plurality of reference voltage sources and the indicia serve to indicate the values of the reference voltages. In order to bring these reference voltages into conformance with the indicia values respectively corresponding thereto, an adjustable resistor 57 is provided having terminals 58, Fig. 4, by means of which the adjustable resistor is connected across the voltage divider network, one terminal 58 being connected to conductor 52 and the other terminal 58 being connected by way of conductor 60 to ground potential at 51. The adjustable resistor 57 also provides a means for adjusting the voltage across the divider network to compensate for variations in the voltage of the power line supplying the oscilloscope or variations in the voltage of the auxiliary power supply to the network, as the case may be.

Figure 3:
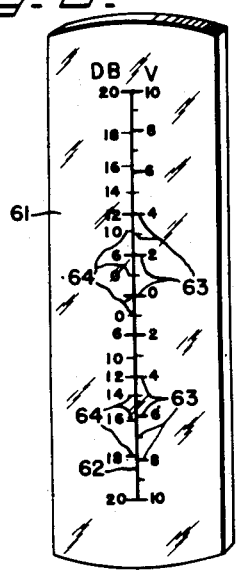
Fig. 3 is a perspective view of a scale according to a preferred embodiment of the invention.
Figure 2:
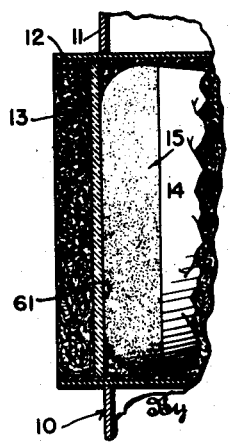
Fig. 2 is a sectional view of a portion of the oscilloscope taken substantially along the line 2—2 of Fig. 1.

The numeral 61 designates a scale, Fig. 3, which may be composed of any transparent material suitable for the purpose such, for example, as Celluloid or a material known in the trade as Lucite. The scale 61 is formed of a relatively thin strip of material of which the ends preferably are formed arcuately thereby to conform substantially to the curvature of the enclosure ring 12 of the oscilloscope whereby the scale 61 may be yieldably urged along the felt 13 substantially into face adjacency with the screen 15 of the cathode-ray tube 14, thereby detachably to secure the scale in such position.

The scale 61 comprises a line 62 formed longitudinally thereon with black ink, for example, or otherwise printed or suitably formed thereon. The line 62 is divided substantially into unit lengths by a plurality of transverse lines 63, with which transverse lines the plurality of indicia comprising various numerals are associated in such a manner as to indicate a consecutive numbering of the unit lengths from the center of longitudinal line 62 to the ends thereof, the transverse lines 63 and numerals associated therewith comprising a voltage scale designated generally by the letter V.

A plurality of transverse lines 64 also are associated with the longitudinal line 62 and are spaced thereon with respect to the transverse lines 63 in accordance with the relationship between volts and decibels. The transverse lines 64 have indicia comprising various numerals associated therewith in such a manner that the transverse lines 64 and associated numerals provide a scale which reads in decibels and which is designated generally by the letters DB.

The numeral 65, Fig. 6, designates generally an alternate form of a scale suitable for use with the present invention. Scale 65 is in the form of a conventional scale usually provided for use with oscilloscopes and having a plurality of tabs 66 by means of which the scale is detachably secured substantially in face adjacency with the cathode-ray tube of the oscilloscope. A plurality of spaced and intersecting lines comprising a grid 67 is printed or otherwise formed on the face of the scale 65 and defines an elongated blank space 68 disposed substantially centrally of the scale, the intersection of the vertical grid line 69 with the horizontal grid line 71 substantially indicating the center of the scale and the point at which the electron beam normally is focused on the screen.

Transverse lines 72 and 73 are associated with the vertical grid line 69 and have numerals associated therewith in such a manner as to provide voltage and decibel scales respectively generally in the same manner as in the case of scale 61 except that the numerals on scale 65 number progressively from the bottom to the top thereof and the numerals on scale 61 number progressively from the center of the scale towards the ends thereof. It will be understood, however, that either arrangement of the numerals may be employed on either of the scales, the arrangement of scale 61 being preferred for the reason that the trace on the screen expands equally on either side of the focal point of the beam. Thus, in using scale 61, the amplitude of the deflection or trace may be read on the scale above or below the central or zero point thereon. In the case of scale 65, however, to measure the amplitude of a deflection fal ing within the limits of the scale, it is first necessary to adjust to zero the lowermost portion of the deflection, as will appear in greater detail as the use of the invention is described.

A preferred method of comparing known and unknown signal components in accordance with the present invention will now be described.

In the use of the invention, assuming the attachment 28 to be secured to the oscilloscope, the various electrical connections of the attachment established therewith, and the scale 61 mounted within the enclosure ring 12, substantially as shown in Fig. 1, an unknown voltage to be measured is applied across the terminal posts 33, 34, and knob 45 of the multi-position switch 37 is moved to the SIG. position thereof. Knob 25 of the horizontal axis gain control is set in the zero position thereof, and the control knob 21 of the vertical axis gain control is adjusted to spread the deflection produced by the unknown voltage over a substantial length of scale 61. Control knob 45 of the multi-position switch is then moved into alinement with the indicia .01, for example, in which position of the knob a vertical deflection is produced which falls within the limits of the scale and exceeds the deflection produced by the unknown voltage, the setting of the vertical axis gain control being unchanged. Control knob 25 is then adjusted to spread the deflection produced by the reference voltage of .01 volt to fu l scale and the control knob 45 thereafter is restored to the SIG. position thereof, thereby to apply the unknown deflection to the scale. Assuming that the deflection now reads at number 8 on the voltage scale V, the value of the unknown voltage is evaluated as eight tenths of the value of the reference voltage producing the full scale deflection or .8 of .01 volt which gives the value of the unknown voltage as .008 volt.

When scale 65 is used in lieu of scale 61, the aforedescribed steps in the method of calibrating the known and unknown deflections on the scale are emp oyed with the exception that an additional step of adjusting the position control 22 to set to zero the lowermost portion of the unknown deflection on the scale is made before obtaining the scale reading corresponding to the unknown deflection.

As an alternate method of calibrating the deflections on scale 65, the focal point of the electron beam is first adjusted to zero on the scale by manipulating the vertical position control knob 22 and thereafter making the same calibrating steps as when scale 61 is employed. In the use of either scale, the level of an unknown signal component may be evaluated as the fractional value of the level of a known signal component which produces the full scale deflection, the reading on the DB scale corresponding to the unknown deflection being used for such evaluation.

It will be obvious that the attachment 28 and either of scales 61 and 65 may be used in making comparative measurements of deflections along the horizontal axis by merely electrically connecting conductor 48 to the horizontal axis terminal post 23 rather than to the vertical axis terminal post 18 and orienting the selected scale with respect to the screen of the cathode-ray tube such that the trace along the horizontal axis coincides with the longitudinal line 62 or 69, as the case may be, of the selected scale, the aforedescribed steps in calibrating the vertical deflections of the electron beam being applicable in calibrating the horizontal deflections thereof with the exception, of course, that the horizontal axis controls of the oscilloscope are manipulated rather than the vertical axis controls.

It further will be apparent that the multi-position switch 37 and the voltage divider network 46 may be employed, if desired, as a means for attenuating an unknown voltage, the unknown voltage being applied between conductor 62 and ground, and the test signal voltage at terminal post 27, or a suitable auxiliary reference voltage, as the case may be, being applied to terminals 33 and 34 of the attachment.

In calibrating the known and unknown deflections on the scale in the immediately preceding case, the known deflection produced by the reference voltage is spread full scale and the multi-position switch 37 is adjusted until a deflection is produced which falls within the limits of the scale, the gain setting being unchanged. The amplitude of the unknown voltage thereafter is evaluated as the fractional value of the known or reference voltage according to the relative amplitudes of their respective deflections and the fractional value is divided by the attenuating factor indicated by the instant setting of the multi-position switch, thereby to give the value of the unknown voltage.

It will be understood that the particular values and ranges of values employed herein have been selected for the purpose of illustrating a particular example of the invention, and, accordingly, are not to be considered in a limiting sense, as other values and ranges of values may be employed to advantage. Moreover, it will be apparent that the methods and apparatus disclosed herein for making comparative measurements need not be limited to oscilloscopes but also may be employed to advantage with other types of deflection producing devices such, for example, as a galvanometer. Furthermore, it will be obvious that while the calibrating apparatus disclosed herein preferably is arranged as an attachment for the oscilloscope, the apparatus may, if desired, be built into the oscilloscope as an integral part thereof.

While the invention has been described in particularity with respect to an example thereof which gives satisfactory results, it will become apparent to those skilled in the art to which the invention appertains, after understanding the invention, that the invention is susceptible of additional examples, embodiments, and modifications thereof without departing from the spirit or scope of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. In a calibrating attachment for an oscilloscope having a source of power and a plurality of terminal posts thereon including a grounded post and a test signal post having said voltage source connected therebetween and a signal amplifier post, the combination of a chassis having a bifurcated portion electrically grounded to and secured detachably to said grounded one of said terminal posts, a multi-position switch mounted on said chassis and having a wiper adapted to engage a plurality of contacts selectively when the wiper is moved into a plurality of positions respectively corresponding thereto, a plurality of resistors connected respectively between adjacent pairs of all but one of said plurality of contacts and comprising a voltage divider network electrical connecting means for connecting said network across said source of power, an adjustable resistor connected electrically across said network for adjusting the voltage thereacross, a plurality of indicia means on the chassis and associated respectively with said plurality of positions of said wiper for indicating the values of reference voltages at different points in said network corresponding to said wiper positions, terminal means on the chassis and insulated therefrom for applying an unknown voltage thereto, electrical connecting means between said terminal means and said one of said contacts, and electrical connecting means for connecting the wiper to said signal amplifier one of said terminal posts whereby the unknown voltage and said reference voltages may be applied thereto selectively as the wiper is moved into engagement with said plurality of contacts.

2. In a calibrating attachment for an oscilloscope having a source of power and a plurality of terminal posts thereon including a grounded post and a test signal post having said voltage source connected therebetween and a signal amplifier post, the combination of a chassis having a bifurcated portion electrically grounded to and secured detachably to said grounded one of said terminal posts, a voltage divider network on said chassis, electrical connecting means for connecting said network across said source of power, an adjustable resistor mounted on the chassis and connected electrically across the network for adjusting the voltage thereacross, a multi-position switch on the chassis and having a wiper engageable with a plurality of contact terminals all but one of which are connected to said network at different points thereon, circuit connections including terminal means on the chassis and insulated therefrom for applying an unknown voltage to said one of said contact terminals, electrical connecting means including said wiper for applying said unknown voltage and a plurality of reference voltages at said different points in the network to said signal amplifier one of said plurality of terminal posts selectively as the switch is operated, and indicia means on the chassis and associated with the several positions of the wiper in which the contact terminals are engaged thereby for indicating the voltage values of said reference voltages and the position of the switch with respect to said one of said terminal contacts.

3. The method of making comparative measurements on an oscilloscope having a scale for indicating the relative amplitudes of beam deflections produced respectively by known and unknown signal components which consists in, applying an unknown signal component to the oscilloscope and adjusting the gain thereof to spread the unknown deflection produced thereby over a substantial length of the scale, with the gain adjustment unchanged applying substitutively for the unknown signal component a known signal component to the oscilloscope, which known signal component produces a known deflection which falls within the limits of the scale and exceeds said unknown deflection and adjusting the gain to spread the known deflection to cover the full scale, with the gain adjustment unchanged applying substitutively for the known signal component the unknown signal component to the oscilloscope to apply the unknown deflection to the scale, whereby the value of the unknown signal component may be read on the scale as a fractional value of the known signal component providing the full scale deflection.

4. The method of making comparative measurements on an oscilloscope having a gain control amplifier and a scale for indicating the relative amplitudes of beam deflections corresponding to known and unknown signal components selectively applied to the amplifier which consists in, applying an unknown signal component to the amplifier, adjusting the gain control of the amplifier to spread the unknown deflection produced by the unknown signal component over a substantial length of the scale, with the adjustment of the gain control unchanged applying substitutively for the unknown signal component a known signal component to the amplifier which known signal component produces a known deflection which falls within the limits of the scale and exceeds said unknown deflection, adjusting the gain control to spread the known deflection to cover the full scale, with the adjustment of the gain control unchanged applying substitutively for the known signal component the unknown signal component to the amplifier thereby to apply the unknown deflection to the scale, whereby the value of the unknown signal component may be read on the scale as a fractional value of the known signal component providing the full scale deflection.

5. The method of making comparative measurements on an oscilloscope having a gain control amplifier, a scale for indicating the relative amplitudes of beam deflections corresponding to known and unknown signal components selectively applied to the amplifier, and a control for shifting the position of the deflections, which consists in applying an unknown signal component to the amplifier, adjusting the gain control of the amplifier to spread the unknown deflection produced by the unknown signal component over a substantial length of the scale, with the gain control in the same setting applying substitutively for the unknown signal component a known signal component to the amplifier which known signal component produces a known deflection within the limits of the scale and exceeding said unknown deflection, adjusting the gain control to spread the known deflection to cover the full scale, with the gain control in the same setting applying substitutively for the known signal component the unknown signal component to the amplifier thereby to apply the unknown deflection to the scale, adjusting the shift control to set the lowermost end of the unknown deflection to zero position on the scale, whereby the value of the unknown signal component may be read on the scale as a fractional value of the known signal component producing the full scale deflection.

6. The method of making comparative measurements of known and unknown signal components with reference to a calibrated scale which comprises the steps of producing a deflection on the scale corresponding to an unknown signal component, amplifying the unknown signal component to extend the deflection produced thereby to cover a substantial length of the scale, with the same amount of amplification producing substitutively for the unknown signal component deflection on the scale a deflection corresponding to a known signal component which is adapted to produce a deflection which falls within the limits of the scale and exceeds the deflection corresponding to the amplified unknown signal component, amplifying the known signal component to extend the deflection produced thereby to cover the full scale, with the same amount of amplification producing substitutively for the known signal component deflection on the scale a deflection corresponding to the unknown signal, whereby the value of the unknown signal component may be read on the scale as a fractional value of the known signal component compared therewith.

7. A calibrating attachment for an oscilloscope having a plurality of terminal posts thereon, including a ground post and a signal amplifier post, the combination of a separate and independent chassis electrically grounded to said ground post, a source of power, a voltage divider network on said chassis, electrical connecting means for connecting said network across said source of power, an adjustable resistor mounted on the chassis and connected electrically across the network for adjusting the voltage thereacross, a multi-position switch on the chassis and having a wiper engageable with a plurality of contact terminals all but one of which are connected to said network at different points thereon, circuit connections including terminal means on the chassis and insulated therefrom for applying an unknown voltage to said one of said contact terminals, electrical connecting means including said wiper for applying said unknown voltage and a plurality of reference voltages at said different points in the network to. said signal amplifier post selectively as the switch is operated, and indicia means on the chassis and associated with the several positions of the wiper in which the contact terminals are engaged thereby for indicating the voltage values of said reference voltages and the position of the switch with respect to said one of said terminal contacts.

ROBERT F. GRUNWALD.

REFERENCES CITED

The following references are of record in the file of this patent:

UNITED STATES PATENTS

| Number | Name | Date |
| --- | --- | --- |
| 746,600 | Stevens | Dec. 8, 1903 |
| 1,297,459 | Gelatt | Mar. 18, 1919 |
| 1,939,434 | Busse | Dec. 12, 1933 |
| 1,960,333 | Du Mont | May 29, 1934 |
| 2,084,760 | Beverage | June 22, 1937 |
| 2,167,177 | Haskins | July 25, 1939 |
| 2,171,216 | Koch | Aug. 29, 1939 |
| 2,240,304 | Koch | Apr. 29, 1941 |
| 2,305,991 | Price | Dec. 22, 1942 |
| 2,412,350 | Morgan | Dec. 10, 1946 |

OTHER REFERENCES

"The Cossor Double-Beam Oscilloscope," in Electronics and Televisions and Short-wave World, March 1940.

"An Oscillograph for Television Development in Proceedings Institute Radio Engineers," August 1937.

"Cathode-Ray Instruments for All Purposes," published by Allen Du Mont Laboratories, Inc. Code T K 381; D 893. Rec'd March 15, 1941.